United States Patent [19]

Pitel

[11] 4,074,344
[45] Feb. 14, 1978

[54] HIGH POWER FACTOR AC TO DC CONVERTER CIRCUIT

[75] Inventor: Ira Jay Pitel, Williamsport, Pa.

[73] Assignee: GTE Sylvania Incorporated, Stamford, Conn.

[21] Appl. No.: 615,503

[22] Filed: Sept. 22, 1975

[51] Int. Cl.² ............................................. H02M 1/14
[52] U.S. Cl. ........................................ 363/44; 363/48; 363/89
[58] Field of Search ................... 321/10, 47; 323/17, 323/22 T, 102, 105, DIG. 1; 363/39, 44, 45, 47, 48, 89

[56] References Cited

U.S. PATENT DOCUMENTS

| | | | |
|---|---|---|---|
| 3,564,384 | 2/1971 | Adler | 323/DIG. 1 |
| 3,626,277 | 12/1971 | Munson | 323/17 |
| 3,733,540 | 5/1973 | Hawkins | 321/47 |
| 3,758,840 | 9/1973 | Oliver | 321/47 X |
| 3,777,239 | 12/1973 | Seri et al. | 323/17 X |
| 3,852,655 | 12/1974 | Justice | 321/47 X |
| 3,890,537 | 6/1975 | Park et al. | 323/DIG. 1 X |
| 3,906,337 | 9/1975 | Depenbrock | 321/10 |
| 3,909,698 | 9/1975 | Nill | 321/47 |

*Primary Examiner*—William M. Shoop
*Attorney, Agent, or Firm*—Norman J. O'Malley; Thomas H. Buffton; Robert T. Orner

[57] ABSTRACT

A high power factor AC to DC converter circuit includes a rectifier circuit coupled to an AC potential source and providing a full-wave rectified pulsating DC potential to a switching regulator circuit with a radio frequency current filter connected in circuit with the rectifier and switching regulator circuits to provide a pulsating DC current in phase with and of at least 50% duration of said pulsating DC potential whereby a power factor of at least 90% is effected.

7 Claims, 6 Drawing Figures

HIGH POWER FACTOR AC TO DC CONVERTER CIRCUIT

BACKGROUND OF THE INVENTION

This invention relates to an AC to DC converter circuit having a high power factor in the range of about 90% or greater.

Generally, AC to DC converter circuits include a rectifier which is coupled to an AC potential source and to a load circuit. A capacitor or charge storage means is connected in shunt with the rectifier. When the input voltage exceeds the voltage on the capacitor plus the voltage drop across two diodes, assuming a full-wave rectifier circuit, current flows into and charges the capacitor. This charging of the capacitor continues until the input potential reaches a maximum value and starts to decrease. Thereupon, charging of the capacitor ceases and a discharge through the load is effected. Thus, a DC potential having a ripple is provided. Moreover, increasing the size of the charging capacitor tends to improve or reduce the undesired ripple but it also reduces the current conduction period or angle which is highly undesirable due to a lowered value of power factor as will be further explained hereinafter.

OBJECTS AND SUMMARY OF THE INVENTION

An object of the present invention is to overcome or at least reduce the above-mentioned undesirable features of the prior art. Another object of the invention is to provide an improved AC to DC potential converter circuit. Still another object of the invention is to provide an improved AC to DC converter whereby the power factor of an AC supply is enhanced. A further object of the invention is to provide an enhanced AC to DC converter circuit having an improved control circuit for stabilizing the output independent of the load.

These and other and further objects, advantages and capabilities are achieved in one aspect of the invention by a fullwave rectifier means coupled to an AC potential source and to a switching regulator circuit coupled to a load with a radio frequency current filter means connected in circuit with the rectifier and switching regulator means for effecting a pulsating DC current in phase with and of at least 50% duration of a pulsating DC potential whereby a power factor of about 90% is achieved.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Figure 1:
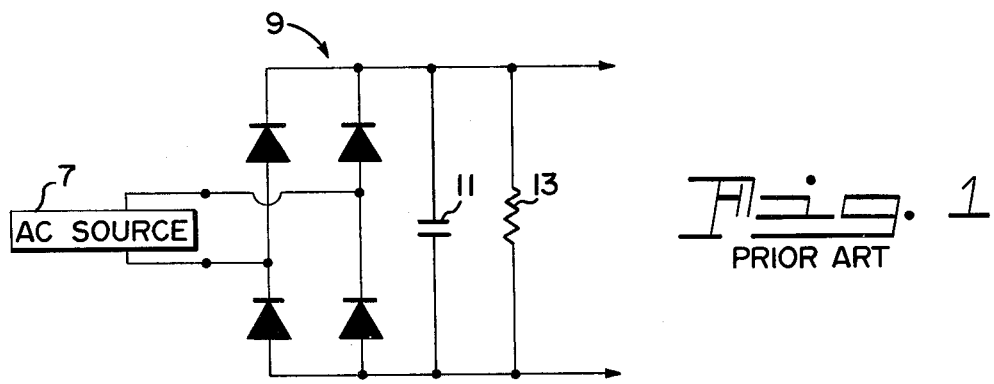
FIG. 1 is an illustration of a typical prior art form of AC to DC converter circuit.

In the drawings, FIG. 1 illustrates a typical prior art AC to DC converter circuit. Therein an AC potential source 7 is coupled to a full wave rectifier bridge circuit 9. A charge storage capacitor 11 and a load circuit, represented as a resistor 13, are parallel connected and shunted across the bridge circuit 9.

Figure 2:
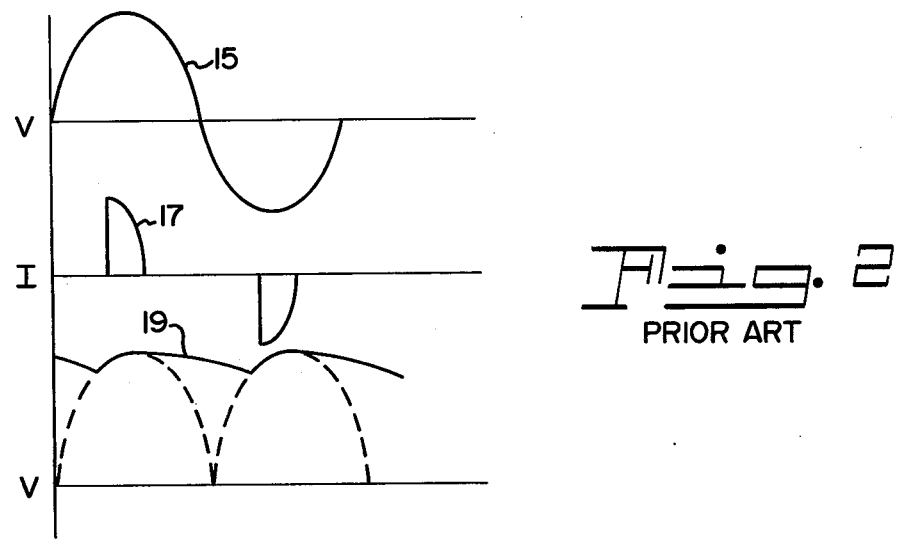
FIG. 2 are curves illustrating the voltage and current waveforms associated with the prior art circuit of FIG. 1.

FIG. 2, representing the above-mentioned prior art circuit, illustrates a typical waveform 15 available from the AC sinusoidal source 7. As the AC potential of the waveform 15 reaches the potential across the charge storage capacitor 11 plus the voltage drop across the bridge circuit 9, current flow is effected as indicated by the current waveform 17. When the AC potential, waveform 15, reaches a maximum value and starts to decrease, current flow, (waveform 17), into the charge storage capacitor 11 ceases and the capacitor 11 begins to discharge. Thus, a DC potential having a ripple, waveform 19, is provided at the load 13. Moreover, increasing the value of the charge capacitor 11 desirably reduces the above-mentioned ripple but undesirably, as will be explained hereinafter, reduces the conduction period or angle of the current, waveform 17.

Generally, the efficiency of transfer of electrical energy from one point to another is a function of power factor. Moreover, the ratio of the real or average power to the apparent power is called power factor (P.F.). Thus, $$P.F. = \frac{\text{Average Power}}{\text{Apparent Power}} = \frac{P}{V_{rms} \cdot I_{rms}}$$

Classically, the power factor (P.F.) for the simple case of a sinusoidal waveform with a passive network having no active components is represented as the $\cos \theta$ where $\theta$ is the angle by which the voltage leads or lags the current. However, a network which includes active components, such as the diodes of a full-wave rectifier for example, is not necessarily linear. Thus, development of a mathematical expression for power factor (P.F.) of a non-linear network is required.

Figure 3:
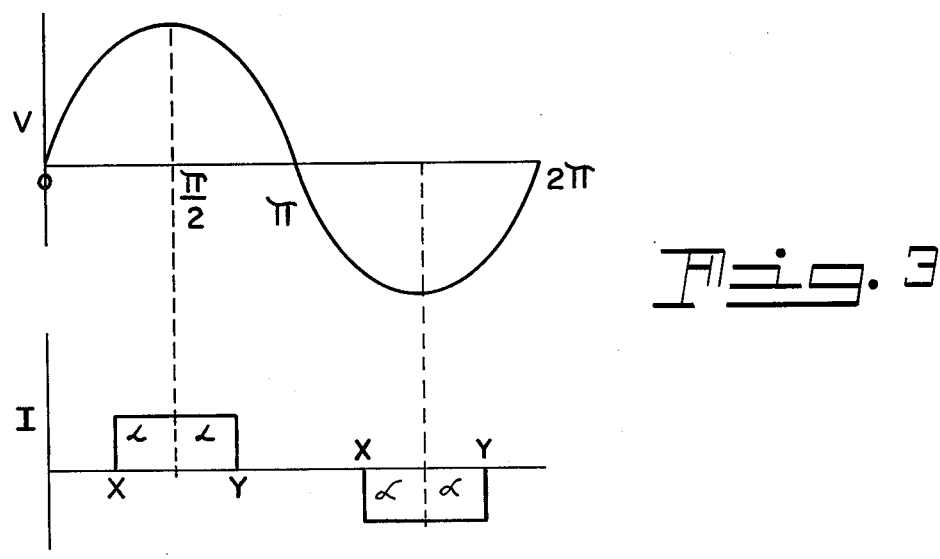
FIG. 3 is an approximated waveform for purposes of power factor calculations.

Referring to FIG. 3, it is assumed that a sinusoidal potential V is applied across a non-linear network. Also, it has been deduced that an optimum waveform of current I should be represented as a substantially square wave of a pulse width $x$-$y$ and symmetrical about the peak of the sinusoidal potential V.

Referring back to the previously mentioned power factor formula:

$$P.F. = \frac{P_{avg}}{V_{rms} \cdot I_{rms}}$$

The average power ($P_{avg}$) for a given period is:

$$P_{avg} = \frac{1}{T} \int_o^T i \, v \, dt$$

Integrating over one-half cycle π and observing that there is only power when current flow is effected, the following formulation is derived:

$$P_{avg} = \frac{1}{\pi} \int_x^y V \sin\theta \, I \, d\theta$$

$$P_{avg} = \frac{VI}{\pi} (-\cos)\Big|_x^y$$

$$P_{avg} = \frac{VI}{\pi} (\cos x - \cos y)$$

Also, determining the $V_{rms}$:

$$V_{rms} = \frac{V_{peak}}{\sqrt{2}}$$

Also, the $I_{rms}$ may be determined:

$$I_{rms} = \sqrt{\frac{1}{\pi} \int_x^y I^2 \, d\theta}$$

$$I_{rms} = \sqrt{\frac{I^2}{\pi} \theta \Big|_x^y}$$

$$I_{rms} = I \sqrt{\frac{y-x}{\pi}}$$

Substituting back in the original formula for P.F.

$$P.F. = \frac{P_{avg}}{I_{rms} \cdot V_{rms}}$$

$$P.F. = \frac{\frac{VI}{\pi}(\cos x - \cos y)}{\frac{V}{\sqrt{2}} \cdot I \sqrt{\frac{y-x}{\pi}}}$$

If $x = \frac{\pi}{2} - \alpha$   $y = \frac{\pi}{2} + \alpha$ $$\sqrt{\pi(y-x)} = \sqrt{\pi\left[(\frac{\pi}{2}+\alpha)-(\frac{\pi}{2}-\alpha)\right]} = \sqrt{2}\sqrt{\pi\alpha}$$

$$P.F. = \frac{\cos(\frac{\pi}{2}-\alpha) - \cos(\frac{\pi}{2}+\alpha)}{\sqrt{\pi\alpha}} = \frac{2\cos(\frac{\pi}{2}-\alpha)}{\sqrt{\pi\alpha}}$$

Figure 4:
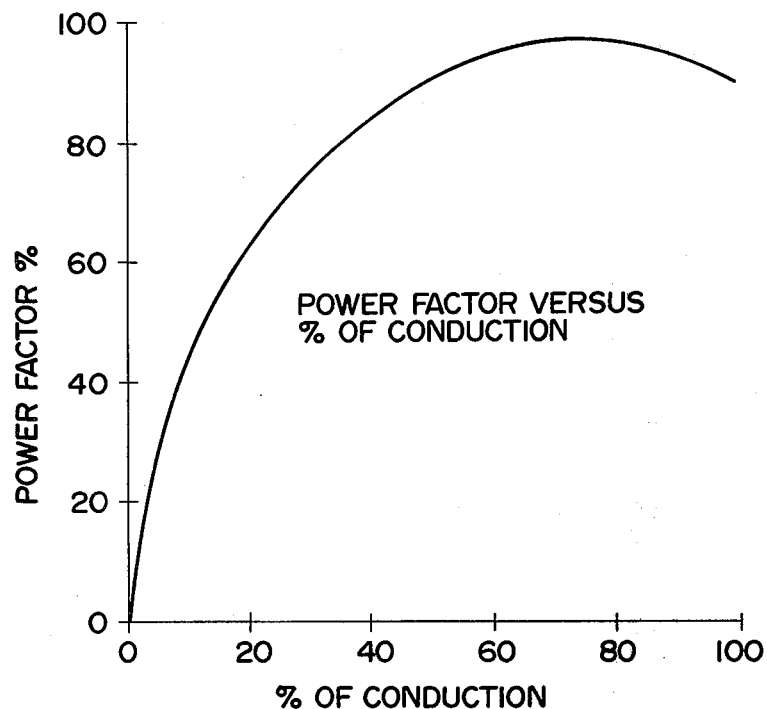
FIG. 4 is a plot of power factor versus the percentage of voltage occupied by current flow.

Using the above equation for power factor of a non-linear waveform, power factor versus percentage of conduction (voltage occupied by the current pulse, i.e. $(2\alpha/\pi) \times 100\%$) can be shown, FIG. 4.

Referring to the curve of FIG. 4, it can readily be seen that the power factor increases as the percentage of current conduction increases. Thus, a percentage current conduction of about 50% is required to obtain a power factor of about 90% (industry standard). Moreover, a maximum power factor of about 96% is obtainable when current conduction is in the area of about 75%.

Also, the above-mentioned curve of FIG. 4 clearly illustrates the deficiencies of the prior art circuitry of FIG. 1. As can be seen in FIG. 2, the percentage of conductivity is much less than the necessary 50% figure to provide a desired power factor of about 90%. Moreover, an increase in value of the charging capacitor 11 will desirably reduce ripple but undesirably reduce the power factor percentage also.

Figure 5:
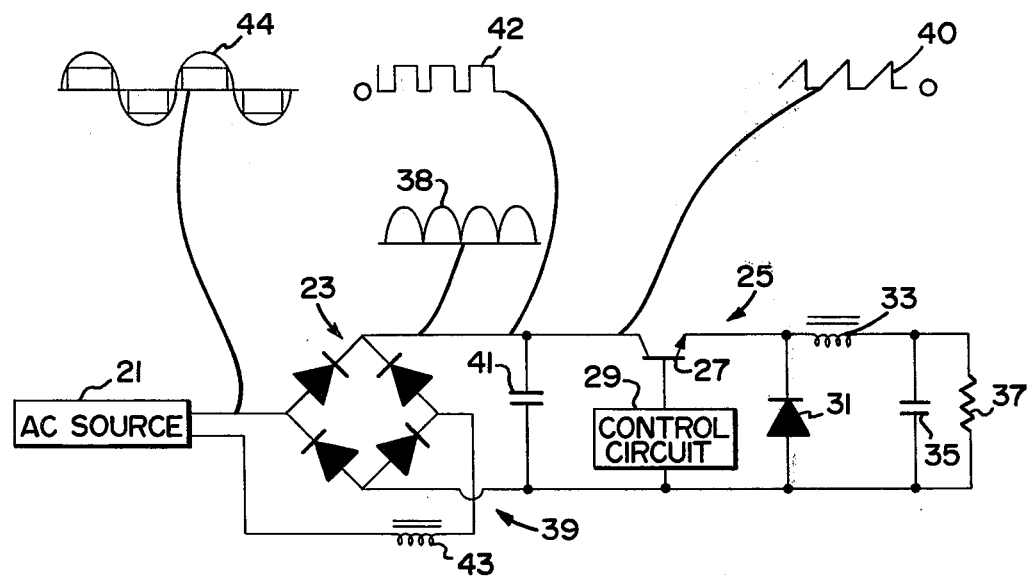
FIG. 5 is a diagrammatic illustration of a high power factor, low loss AC to DC converter circuit.

FIG. 5 illustrates diagrammatically a high power factor, AC to DC converter circuit. Therein, an AC potential source 21 is coupled to a full-wave rectifier 23. The full-wave rectifier 23 provides a full-wave rectified pulsating DC potential which is applied to a switching regulator circuit 25.

The switching regulator circuit 25 includes a switching transistor 27 coupled by a control circuit 29 to a potential reference level. A diode 31 and a series connected inductor 33 and capacitor 35 are shunted across the switching transistor 27 and control circuit. A load illustrated in the form of a resistor 37 shunts the capacitor 35.

Coupled in circuit with the rectifier 23 and switching regulator circuit 25 is radio frequency current filter network 39. This current filter network 39 includes a capacitor 41 connected to the rectifier 23 and to the switching regulator circuit 25. Also, an inductor 43 couples the AC potential source 21 or the rectifier 23.

As to the operation, a potential from the AC potential source 21 is rectified by the full-wave rectifier 23 to provide a pulsating DC potential 38 at a frequency of about 120 Hz for example. At the same time, the switching regulator circuit 25 is operating, at a 20 KHz frequency for example, and a waveform of pulsating current flow 40, at a 20 KHz frequency, appears at the collector of the switching transistor 27.

This waveform of pulsating current flow 40 is acted upon by the filter network 39 to provide an envelope of the pulsating current flow 42 which has a frequency of 120Hz and is in phase with and symmetrically centered in the pulsating DC potential 38. Thus, the AC potential source 21 provides an AC potential and a pulsating current in phase and symmetrically centered therein, waveform 44. Moveover, a current having a duration of 50% of the AC potential provides a power factor of about 90% as indicated by the curve of FIG. 4.

Figure 6:
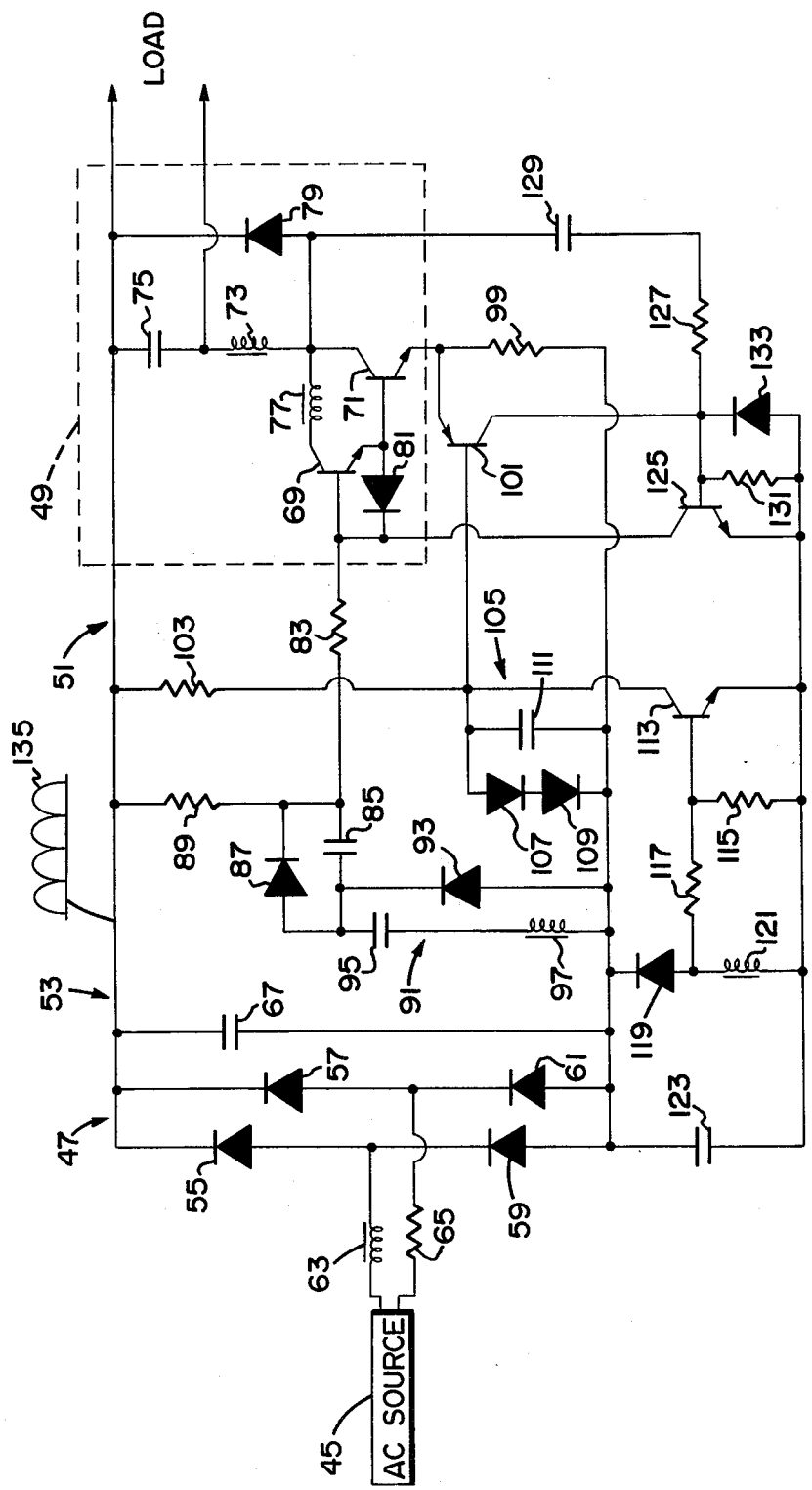
FIG. 6 is a preferred embodiment of a low loss, high power factor AC to DC converter circuit including control circuit details.

As to a preferred embodiment of the AC to DC converter circuit, FIG. 6 illustrates an AC potential source 45 coupled to a full-wave rectifier circuit 47. The rectifier circuit 47 is coupled to a switching regulator means 49 having control circuitry 51 associated therewith. A radio frequency current filter means 53 is connected in circuit with the rectifier circuit 47 and switching regulator means 49.

The rectifier circuit 47 is of the full-wave bridge-type and includes the usual four diodes, 55, 57, 59, and 61 arrayed in a common bridge configuration. The rectifier circuit 47 is coupled to the AC potential source by an inductor 63 and resistor 65 of the radio frequency current filter means 53. Also, a capacitor 67 of the radio frequency current filter means 53 shunts the rectifier circuit 47.

Coupled to the rectifier circuit 47 and radio frequency filter means 53 is a switching regulator means 49 having control circuitry 51. The switching regulator means 49 has first and second transistors 69 and 71 in a Darlington configuration to form a switching transistor. The collector of the second transistor 71 is coupled by a series connected second inductor 73 and capacitor 75 to one end of the bridge rectifier circuit 47 and via a first inductor 77 to the collector of the first transistor 69. A diode 79 shunts the series connected second inductor 73 and capacitor 75 while the load appears across the capacitor 75.

The base of the second transistor 71 is connected to the emitter of the first transistor 69 and via a diode 81 to the base of the first transistor 69. The base of the first transistor 69 is coupled via a resistor 83 to a capacitor 85 shunted by a diode 87 and via a resistor 89 to the diodes 55 and 57 of the rectifier means 47. The junction of the capacitor 85 and diode 87 is connected to a DC restorer circuit 91 which includes a diode 93 in parallel with a series connected capacitor 95 and a third inductor winding 97 coupled to the junction of the diodes 59 and 61 of the rectifier means 47.

Referring back to the switching regulator means 49, the emitter of the second transistor 71 of the Darlington configuration is coupled by a current sampling resistor 99 to the junction of the diodes 59 and 61 of the rectifier means 47. The emitter of the second transistor 71 is also connected to the emitter of a transistor 101 having a base coupled by a resistor 103 to one side of the rectifier means 47 and by a clamp circuit 105, to the opposite side of the rectifier means 47. The clamp circuit 105 includes series connected diodes 107 and 109 shunted by a capacitor 111.

The base of the transistor 101 is also connected to the collector of a transistor 113. The base of transistor 113 is connected by a resistor 115 to the emitter and by a resistor 117 to a diode 119 coupled to the rectifier means 47 and by a fourth inductor winding 121 to the emitter. A capacitor 123 shunts the diode 119 and fourth inductor winding 121.

The collector of the transistor 101 is connected to the base of a transistor 125. The base of the transistor 125 is coupled by a feedback network including a series connected resistor 127 and capacitor 129 to the collector of the second transistor 71 of the switching regulator means 49. Also, the base of the transistor 125 is coupled by a parallel connected resistor 131 and diode 133 to the emitter which is coupled via the capacitor 123 to the diodes 59 and 61 of the rectifier means 47. The collector of the transistor 125 is connected to the base of the first transistor 69 of the switching regulator means 49.

As to operation, let it be assumed that an initial charge is present on capacitor 75, 95, 111, and 123. The rectifier means 47 provides a rectified pulsating DC potential, waveform 135, wherefrom capacitor 85 is charged via the resistor 89. The charging of the capacitor 85 develops a bias voltage causing conduction of the first transistor 69 and the second transistor 71 of the darlington configuration of the switching regulator means 49. Conduction of the second transistor 71 causes development of a potential across the second inductor winding 73 which induces a potential into the third inductor winding 97 to provide a positive feedback network which turns transistor 69 on harder.

Also, conduction of the second transistor 71 causes a potential to be developed across the sampling resistor 99. When the potential at the emitter of transistor 101, developed across the sampling resistor 99, is 0.6 volt greater than the potential at the base, transistor 101 is turned on. Conduction of the transistor 101 causes potential development across the resistor 131 turning on transistor 125. Conduction of the transistor 125 starts to turn off the first transistor 69 of the switching regulator means 49.

Moreover, as the first transistor 69 of the switching regulator 49 starts to turn off, capacitor 129 charges which turns the transistor 125 on hard and rapidly turns the first and second transistor 69 and 71 off hard. The diode 81 is part of the darlington configuration which clamps the negative potential of the base-emitter junction of transistor 69 at about 0.6 volts. Thus when transistor 125 is on, both transistors 69 and 71 have their base-emitter junction reverse biased whereby fast turn-off is enhanced.

With the first and second transistor 69 and 71 of the switching regulator means 49 in an off or non-conducting state, the diode 79 in circuit with the second inductor winding 73 and load capacitor 75 is conducting. Also, the diode 93 of the DC restorer 91 is in a conductive state forming a DC restorer potential and the diode 119 is conductive forming a negative bias supply.

Energy stored in the second inductor 73 is released into the load capacitor 75 upon conduction of the diode 79. In turn, the second inductor 73 causes a potential to be induced across the fourth inductor winding 121. Should the voltage appearing at the load capacitor 75 be too high, a large potential is induced into the fourth inductor winding 121 from the second inductor winding 73. This increased potential appearing at the fourth inductor winding 121 turns on the transistor 113 whereupon the voltage appearing on the capacitor 111 is reduced.

A reduction in the voltage appearing at the capacitor 111 causes a reduction in the threshold level of the transistor 101. Thus, the transistor 101 turns on when peak current of a decreased magnitude appears across the sampling resistor 99. Also, the turning on of the transistor 101 at lower peak currents causes a faster turn on of the transistor 125 which, in turn, causes a more rapid turn off of the first and second transistors 69 and 71 of the switching regulator means 49.

Also, an increase in the load across the load capacitor 75 will cause a decrease in potential thereacross and a decrease in potential across the second inductor 73 and induced into the fourth inductor winding 121. Thus, the transistor 113 will not be turned on and a larger voltage will be developed at the capacitor 111. A larger voltage at the capacitor 111 will allow an increase in the peak current of the sampling resistor 99 before conduction of the transistor 101 is effected. Thus, the load capacitor 75 will charge to a higher voltage to compensate for the added load.

Moreover, the diodes 107 and 109 serve as a clamping circuit for the capacitor 111 to maintain a peak level within desired limits. Also, the resistor 115 and 117 serve to establish the bias level of the transistor 113 whereby the output voltage may be altered. Thus, it is the transistor 113 which controls the charge on the capacitor 111 which controls the operation of the transistor 101 in accordance with the peak current level of the sampling resistor 99. In other words the output voltage is referenced against the base to emitter junction of the transistor 113.

As an example, but in no way to be considered as limiting the invention, the following component values are appropriate to a particular embodiment:

| | |
|---|---|
| Inductor: | core - rod ferrite $\frac{1}{2}'' \times 2''$ |
| 63 | 100-turns, #14 wire |
| Transformer: | core - rod ferrite $1'' \times 2\frac{1}{4}''$ |
| 73 | 40-turns, #16 wire |
| 77 | 2-turns, #21 wire |
| 97 | 3-turns, #21 wire |
| 121 | 3-turns, #31 wire |
| Diodes: | |
| 55, 57, 59, 61, 79 | 3-Amp 200-volt |
| 107, 109, 133 | IN 4148 |
| 87, 81, 93, 119 | IN 4001 |
| Transistors: | |
| 69 | D44Q5 - GE |

-continued

| | |
|---|---|
| 71 | 2N6306 |
| 101 | MPSA55 - Motorola |
| 113 | 2N2222 |
| 125 | TIP41 - Texas Instruments |
| Capacitors: | |
| 67 | 8 uf |
| 75 | 1000 uf |
| 85 | 1 uf |
| 95 | 50 uf |
| 111 | 250 uf |
| 123 | 100 uf |
| 129 | .01 uf |
| Resistors: | |
| 65 | 0.5 - ohms |
| 89 | 27.0 - K-ohms |
| 103 | 100.0 - K-ohms |
| 83 | 10.0 - ohms |
| 99 | 0.2 - ohms |
| 127 | 10.0 - ohms |
| 131 | 10.0 - ohms |
| 117 | 68.0 - ohms |
| 115 | 12.0 - ohms |

Thus, there has been provided a unique AC to DC converter circuit having a high power factor. Also, control circuitry has been provided for enhancing the operational features of the circuitry. The circuitry not only enhances the power factor but also provides low power loss capabilities. Moreover, the circuitry is relatively uncomplicated and inexpensive of both components and assembly.

While there has been shown and described what is at present considered the preferred embodiment of the invention it will be obvious to those skilled in the art that various changes and modifications may be made therein without departing from the invention as defined by the appended claims.

What is claimed is:

1. A high power factor AC to DC converter circuit comprising:
   a load circuit;
   switching regulator means for providing a DC potential, said switching regulator means including an oscillator circuit coupled to a control circuit with said oscillator circuit having an output circuit with a series connected inductor and capacitor, said capacitor coupled to said load circuit and said inductor coupled to a DC restorer connected to said oscillator circuit;
   rectifier means for providing a full-wave rectified pulsating DC potential coupled to said switching regulator means;
   a source of AC potential coupled to said rectifier means; and
   a radio frequency current filter means connected in circuit with said rectifier means and switching regulator means, said filter means including a radio frequency responsive capacitor shunting said rectifier means a pulsating current flow in phase with and of at least 50% duration of said potential available from said AC potential source a power factor of at least 90%.

2. The high power factor AC to DC converter circuit of claim 1 wherein said switching regulator means includes an oscillator circuit coupled to a control circuit.

3. The high power factor AC to DC converter circuit of claim 1 wherein said radio frequency current filter includes a capacitor shunting said rectifier means and coupled to said switching regulator means and an inductor coupling said rectifier means to said source of AC potential.

4. The high power factor AC to DC converter circuit of claim 1 wherein said switching regulator means includes an oscillator circuit coupled to a control circuit having fast turn on and fast turn off networks coupled to said oscillator circuit.

5. The high power factor AC to DC converter circuit of claim 1 wherein said radio frequency current filter means has a 3db attenuation point at a frequency greater than the frequency of said full-wave rectified pulsating DC potential and less than the switching frequency of said switching regulator means.

6. The high power factor AC to DC converter circuit of claim 1 wherein said switching regulator means includes a switching electron device and a positive feedback network coupled thereto for effecting rapid turn-on or conduction.

7. An AC to DC converter circuit with a high power factor comprising:
   means for providing an AC potential;
   means coupled to said means for providing an AC potential for providing a rectified full-wave pulsating DC potential;
   means coupled to said means for providing a rectified full-wave pulsating DC potential for providing a DC potential, said means effecting a radio frequency pulsating current flow therein and including a switching regulator having a switching electron device coupled to an output circuit including a series connected inductor and capacitor and to a control circuit means, said control circuit means having a DC restorer circuit means coupled to said inductor of said output circuit and to said switching electron device to provide a substantially constant DC potential to said switching electron device; and
   means connected in circuit with said means for providing a rectified full-wave pulsating DC potential and said means for providing a DC potential said means including a radio frequency capacitor shunting said means for providing a rectified full-wave pulsating DC potential whereby a pulsating DC current in phase with and of at least 50% duration of said potential available from said AC potential causes said means for providing an AC potential to have a power factor of about 90%.

* * * * *

UNITED STATES PATENT AND TRADEMARK OFFICE
CERTIFICATE OF CORRECTION

PATENT NO. : 4,074,344
DATED : February 14, 1978
INVENTOR(S) : Ira Jay Pitel

It is certified that error appears in the above-identified patent and that said Letters Patent are hereby corrected as shown below:

Col. 2, lines 65-66 (Last formula) - Delete "$P_{avg} = \frac{1}{T} T i v \, dt$"

and insert -- $P_{avg} = \frac{1}{T} \int_0^T i v \, dt$ --

Col. 3, line 6 (First formula) - Delete "$P_{avg} = \frac{1}{\pi} \, {}_x^y V \sin \theta \, I \, d\theta$"

and insert -- $P_{avg} = \frac{1}{\pi} \int_x^y V \sin \theta \, I \, d\theta$ --

Col. 3, line 22 (Fifth formula) - Delete "$I_{rms} = \sqrt{\frac{1}{\pi} \, {}_x^y I^2 \, d\theta}$"

and insert -- $I_{rms} = \sqrt{\frac{1}{\pi} \int_x^y I^2 \, d\theta}$ --

Col. 4, line 22 - After "21", delete "or" and insert -- to --.

UNITED STATES PATENT OFFICE
CERTIFICATE OF CORRECTION

Patent No. 4,074,344  Dated February 14, 1978

Inventor(s) Ira Jay Pitel

It is certified that error appears in the above-identified patent and that said Letters Patent are hereby corrected as shown below:

Column 6, line 64, Detele "#31 wire" and insert

-- #21 wire --.

Signed and Sealed this

Twenty-fifth Day of July 1978

[SEAL]

Attest:

RUTH C. MASON
Attesting Officer

DONALD W. BANNER
Commissioner of Patents and Trademarks